United States Patent [19]

Zion et al.

[11] Patent Number: 4,939,037

[45] Date of Patent: Jul. 3, 1990

[54] COMPOSITE SIGN POST

[75] Inventors: Earl M. Zion, Newark, Ohio; John E. Freeman, 706 W. 14th St., Big Spring, Tex. 79720

[73] Assignee: John E. Freeman, Big Spring, Tex.

[21] Appl. No.: 164,424

[22] Filed: Mar. 2, 1988

[51] Int. Cl.$^5$ .................. B32B 17/00; B32B 17/04
[52] U.S. Cl. .................. 428/36.3; 40/607; 52/98; 52/298; 138/130; 404/10; 405/298; 428/34.4; 428/34.5; 428/34.6; 428/34.7; 428/35.7; 428/113; 428/156; 428/902
[58] Field of Search .................. 428/36, 113, 116, 188, 428/902, 156, 105, 34.4, 34.5, 34.6, 34.7, 35.7, 36.3; 138/130; 40/607; 52/98, 298; 404/10; 405/298; 416/230

[56] References Cited

U.S. PATENT DOCUMENTS

| Re. 32,045 | 12/1985 | Schmanski | 404/10 |
|---|---|---|---|
| 2,969,812 | 1/1961 | De Ganahl | 138/130 |
| 3,417,525 | 12/1968 | Dashio | 52/298 |
| 3,524,779 | 8/1970 | Masters et al. | 138/130 |
| 3,709,112 | 1/1973 | Ebinger | 94/1.5 |
| 3,820,906 | 6/1974 | Katt | 403/2 |
| 3,853,418 | 12/1974 | Druin et al. | 404/1 |
| 3,896,858 | 7/1975 | Whatley | 138/130 |
| 4,021,977 | 5/1977 | Deike | 52/98 |
| 4,133,154 | 1/1979 | Ruzicka | 52/298 |
| 4,173,128 | 11/1979 | Corvelli | 64/1 |
| 4,435,930 | 3/1984 | Plym | 52/98 |
| 4,621,980 | 11/1986 | Reavely et al. | 416/226 |

Primary Examiner—Ellis P. Robinson
Assistant Examiner—Archene A. Turner
Attorney, Agent, or Firm—Matthews & Associates

[57] ABSTRACT

A composite fiber and resin sign post for displaying highway signs which provides great reduction in vehicle damage in the event a vehicle moving at high speed collides with the sign post. This potential is achieved by the controlling the mode and location of the structural failure of the post upon impact. The failure mode of the post is controlled by varying the configuration of the post in cross-section, in combination with varying the specific fibers and resins, and in further combination with varying the location and placement of the fibers. The composite post may be constructed by pultrusion, filament winding, or related processes. A preferred embodiment uses a ground anchor socket constructed either by processes and components similar to those used in manufacturing the post, or by stamping sheet steel and spot welding to form a socket. The anchor socket provides additional control over the post failure and makes replacement of damaged posts quicker and easier.

16 Claims, 3 Drawing Sheets

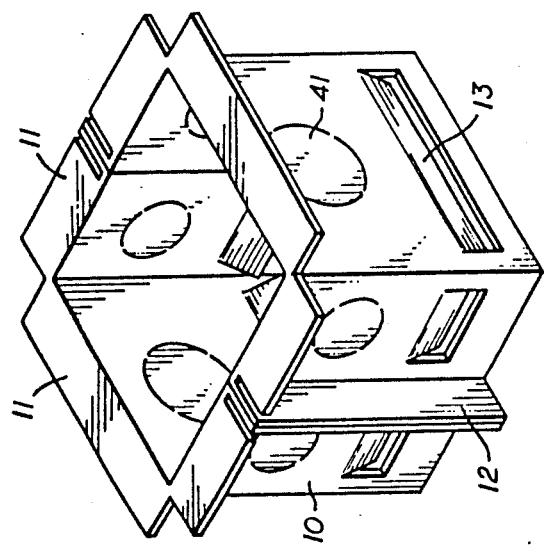
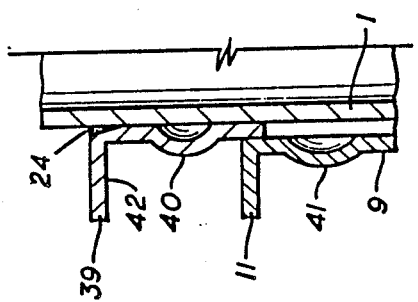
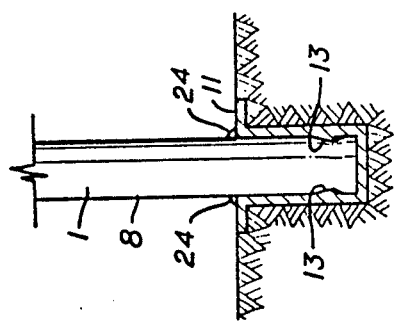
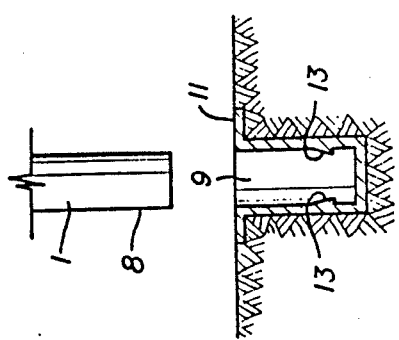
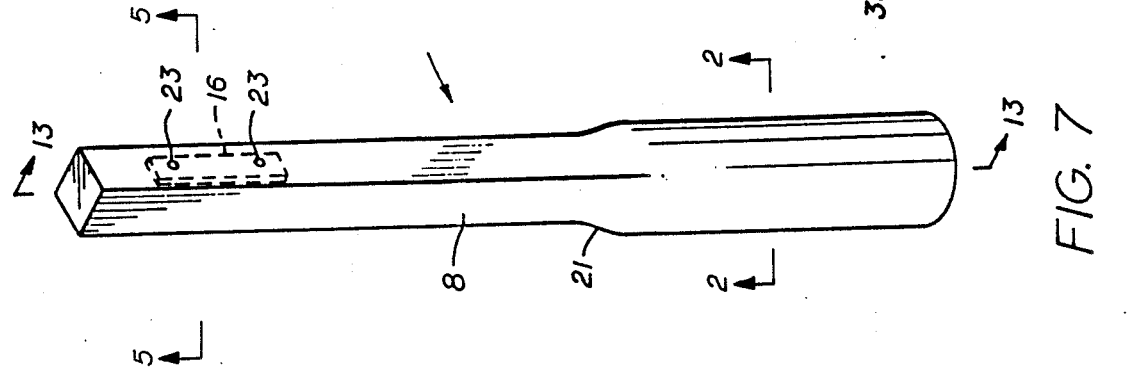

COMPOSITE SIGN POST

BACKGROUND OF THE INVENTION

This invention relates to sign posts, and more particularly to sign posts which are adapted for supporting highway signs. Due to the widespread use of signs along highways, various governmental bodies have developed standardized criteria for highway signs. Factors considered important in the development of those criteria are: the design loadings, design life of a post exposed to the elements, initial cost, replacement cost, versatility, installation method, and vehicle speed change.

The design loadings are figured from wind pressure on the sign and wind buffeting. The method of installation may also generate significant stresses. Versatility is demonstrated by posts that may be used in combination to support larger signs, or by posts that are able to support more than one sign per post. Safety is at present usually defined in terms of deceleration time to protect vehicle occupants, and a qualitative assessment of affects on vehicles under body damage, and front end failure.

The vast majority of the present applications for highway sign posts are filled by steel "U" channel posts or steel tubes. Standard sections of these steel channel posts are approximately 2 inches deep and 3.5 inches across, and weigh 3 pounds per foot. Applications for lighter signs are filled by a similar steel section with a weight of 2 pounds per foot. These steel sections can be drilled or punched with holes at standard locations during the manufacturing process so that signs can simply be bolted to the post in the field. Installation is normally accomplished by driving the post into the ground, or by digging a post hole. Steel posts withstand weathering for up to 15 years before they require replacement.

One problem with the present art of highway sign posts is that during a vehicle collision, the steel post will yield upon impact and will bend over the hood of the automobile. Because the post remains rigid and deformed even after this yielding failure it can penetrate the windshield. This causes severe damage to the automobile, loss of control by the driver, and many times results in injury to the vehicle occupants. The improved fiberglass (F.R.P.) or fiber and resin composite highway sign post of this invention is designed to reduce this hazard of highway travel by more precisely controlling the failure mode of the sign post, by selecting a component and post configuration combination that gives the desired failure mode and location. The high strength, lighter weight, and failure mode imparted by the fibers of a tubular fiber and resin construction relative to the prior art steel post provide for a sign post that will fail in shear, or in equivalently safe mode, at or near the impact point upon high speed impact by a moving body. A natural shear plane can also be provided by abruptly varying the section properties of the post at a location that will be near the impact point of a vehicle bumper when the post is installed. The composite sign post of this invention is designed so that in a slow speed collision the post will fail near the ground connection and lay flat, and in a very high speed collision the post will fail near the impact point and the upper portion will fly up over the vehicle. Both modes of failure do minimal damage to the vehicle.

Prior art patents of relevance are: U.S. Pat. No. 4,092,081 (Schmanski), U.S. Pat. No. 3,820,906 (Katt), and U.S. Pat. No. 3,709,112 (Ebinger). Schmanski discloses a marker post designed to flex and lay over upon impact and then to return to its upright position. These marker posts would not have the structural properties of the closed tube design of the present invention. Consequently, unless completely redesigned or made inordinately heavy, they would not support a sign subjected to the expected loadings. In addition, a post built to highway sign height would appear to pose the same threat to windshield penetration since at high impact the Schmanski post could lay over the hood of a colliding vehicle. The Schmanski post is designed to withstand relatively large axial loads during its installation by driving. In the wrapped over position the upper end of the Schmanski post could penetrate the windshield and injure the occupants.

The Katt patent discloses a standard steel channel sign post of two segments that is provided with a frangible connection to connect a lower segment of the post to an upper segment of the post. The Katt disclosure specifically states a limitation to open channel steel type posts and its multiple components apparently must be assembled in the field or greater care must be taken during installation to prevent damaging the connection. The problem addressed in Katt is that of securing the upper segment from being projected due to impact from a vehicle while providing a specific failure mode. The need for securing does not present itself with the post of this invention because of the much lighter weight of the post and the resulting reduced threat of vehicle damage. It further is not apparent that upon a high speed impact the steel channel of Katt could not deform and lay over the hood of the impacting vehicle, with the likelihood of serious injury to the occupants. Although stressed to yield, the Katt post remains stiff and bent. The stiffness integrity of the Katt post is not destroyed as it is in the composite post of the present invention.

Ebinger discloses another guide post of flexible construction that operates similar to that of Katt. There is no provision for allowing but controlling the failure of the posts as there is in the present invention The Ebinger post is flexible to begin with and remains that way. The post herein is rigid to begin with, but the stiffness is destroyed by collision.

For a given Weight per foot, the improved sign post of this invention is many times stiffer in torsion than the standard steel post, because of the cross-section utilized. The versatility is therefore improved for a given weight per foot because the post of this invention will support a larger sign or a larger number of signs. The weathering ability of the post of this invention is on a par with that of the standard steel post when coated. Installation of the post of this invention is by driving or drilling as some of the standard posts are installed, or by utilizing a ground anchor socket. The cost of initial installation in the augured hole applications will be similar to that of a standard post, while the cost of replacement installation will be less than the standard steel post in the applications utilizing an anchor socket because of the controlled failure mode.

SUMMARY OF THE INVENTION

This invention provides a sign post for use along highways that furnishes improved reduction in vehicle damage in the event the post is struck by a moving vehicle. The improvement is realized by providing a controlled failure upon impact through the combination of selecting high strength low weight components such as fiberglass for a composite construction and by utilizing fiber orientation to provide the required strength and failure characteristics, or by using such a design in combination with configuring the post to provide a likely shear plane at the approximate location of the vehicle-post impact point. Upon impact the integrity of the resin matrix is destroyed, and without the stiffness provided by the cured resin, the post will simply lay flat or completely shear. Due also to the low weight of the post, vehicle damage is minimized because the post is far less likely to penetrate the windshield of a colliding vehicle. The post matches a conventional sign post's qualities of strength, useful life, versatility, ease of installation and economy.

BRIEF DESCRIPTION OF THE DRAWINGS

The following drawings are provided by way of illustration:

FIG. 7 is a perspective view of an alternative embodiment of the post of this invention, depicting a change in the cross-section of the post;

FIG. 8 is a partial elevation cross-sectional view of the lower end of a post according to this invention including a cross-sectional view of an alternative ground anchoring means prior to installation;

FIG. 9 is a partial elevation cross-sectional view of the lower end of a post according to this invention including a cross-sectional view of an alternative ground anchoring means after installation;

FIG. 10 is a perspective view of an embodiment of an optional ground anchor socket for installation of the sign post;

FIG. 11 Another alternative embodiment of the anchor socket of FIG. 10;

FIG. 12 A cross sectional view of an alternative embodiment of the anchor socket connection of FIG. 10;

DESCRIPTION OF THE INVENTION

Figure 4:
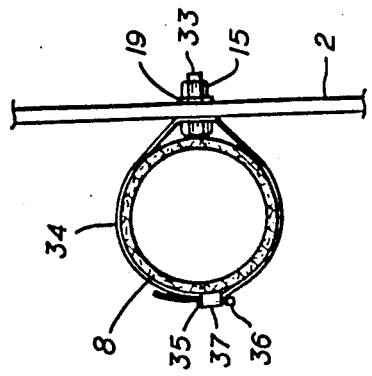
FIG. 4 is another alternative embodiment of FIG. 2.

Referring now to the drawings the present invention will now be described with more particularity.

The sign post of this invention was designed to compete with a conventional steel channel, or pipe highway sign post in terms of strength in torsion, bending, and in the terms of cost and durability, but to provide greater potential for vehicle damage reduction in the event of a vehicle sign post collision. The potential is provided because the failure mode of the post is controlled to minimize the likelihood of the upper end of the post penetrating the windshield of the vehicle in the event of a vehicle post collision, and further to minimize damage to the vehicle. A composite fiber 17 and resin 18 construction was chosen because of the range of characteristics that can be achieved by altering the design through varying the particular resins or fibers, the fiber orientation, and through varying the configuration of the post itself. See FIGS. 2, 5. The resultant post is lighter than prior steel posts which also minimizes potential damage.

Figure 3:
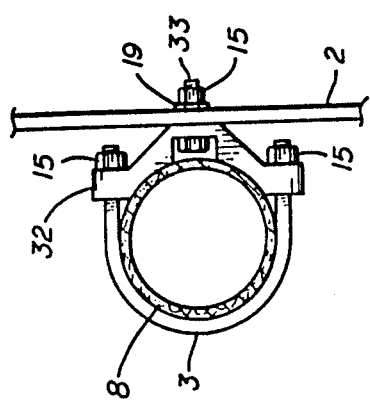
FIG. 3 is an alternative embodiment of FIG. 2.
Figure 2:
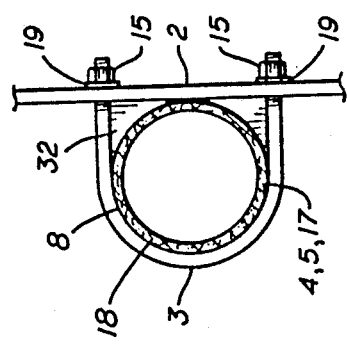
FIG. 2 is a cross-sectional view through the upper segment of the post and sign of FIG. 1.
Figure 1:
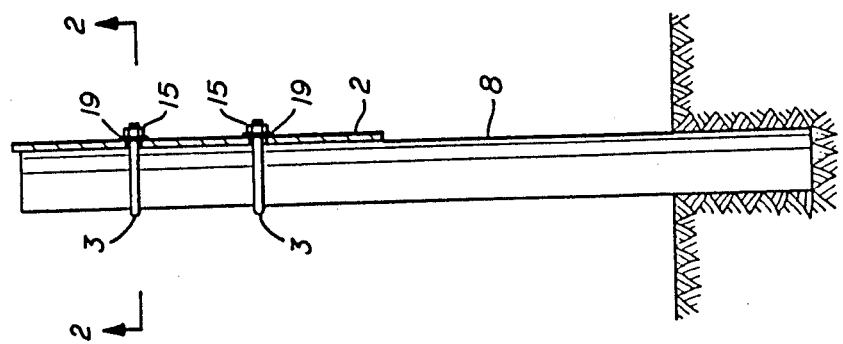
FIG. 1 is a side elevation of the sign post of this invention, installed in the ground with a sign installed.
Figure 16:
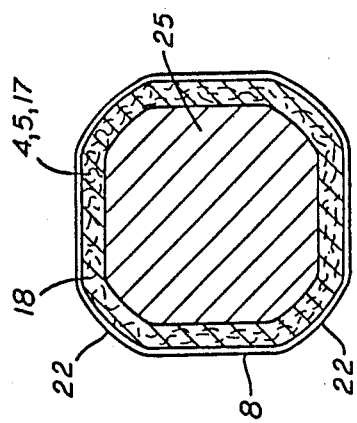
FIG. 16 is a cross-sectional view through the upper segment of the post of FIG. 13.
Figure 15:
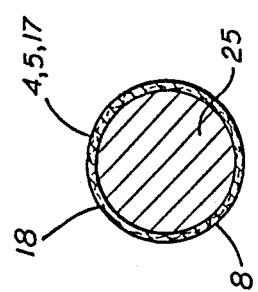
FIG. 15 is a cross-sectional view through the lower segment of the post of FIG. 13.

Referring now particularly to FIG. 1, there is depicted one embodiment of the composite post 1 of this invention. The post 1 is illustrated in a side view with a highway sign 2 attached by a U-bolt 3 mounting system. The U-bolt 3 mounts are again depicted in FIG. 2, where they are depicted as a common arrangement of bolt 3, washer 19 and hex nut 15. Of note is the cast mounting clamp 32 which prevents the FRP post from being crushed by the concentration of stress that would occur if the U-bolts were tightened without the casting. FIG. 2. This casting may be omitted where a foam core is utilized as described below. Alternative mountings are illustrated in FIGS. 3 and 4. FIG. 3 illustrates a variation on the U-bolt 3 and cast clamp 32. In this variation the clamp 32 is securely fastened to the post 1 by the U-bolt 3 and nut 1 arrangement, and then the sign 2 is attached to the cast clamp 32 by yet another fastener, sign bolt 33. FIG. 4 illustrates a sign mounting comprised of a sign bolt 33, nut 15, and washer 19, which is used in combination with a galvanized steel strap 34, which is fastened securely around the post 1 with a bolt 36, nut 35, and lock washer 37.

Important to the choice of the overall cross-sectional dimensions is the consideration of the design loads that the improved post 1 will be subject to. The calculation of these loads is a simple matter of structural design. Obvious considerations are the loads generated by installation, by weight of the sign 2 or signs attached, and for the larger signs, wind pressure and wind buffeting loads. Once the design loads have been calculated the required bending stiffness and torsional stiffness are known. With these known values, design of the post is a matter of providing a suitable cross section for a given modulus of elasticity, or conversely by providing a suitable modulus of elasticity for a given cross section. The key to designing a post that has a built in controlled failure mode, is to design a composite with the desired modulus of elasticity, provided by correctly orienting the fibers. The advantage of using a composite safety post, is that the modulus of elasticity need not be the same in all dimensions, unlike that of steel, which has a single value of $30 \times 10^6$ psi. By way of example and not to be understood as a limitation, the test post of this invention which will be described in detail below, was designed to have a modulus of elasticity in bending of approximately $5 \times 10^6$ psi and a modulus of elasticity in shear of approximately $1 \times 10^6$. Tests have been run on a composite post configured as in FIG. 5, with a square tubular section with radiused corners, of nominal 4 inch by 4 inch outside dimensions. These tests indicate satisfactory performance for standard highway signs could be provided by a circular post of 4.8" in diameter with a nominal wall thickness of ⅛". This 4.8" circular post, when constructed as described below, would provide a bending stiffness of $25.1 \times 10^6$ lb-in$^2$ and a torsional stiffness of $9 \times 10^6$ lb-in$^2$. This 4.8" circular post weighs approximately 1.8 pounds per foot. For comparison, the three pound per foot steel channel has a bending stiffness of $11.73 \times 10^6$ lb-in$^2$ and a torsional stiffness of only $0.15 \times 10^6$ lb-in$^2$. The diameter, wall thickness, and shape of the composite may each or all be varied within a wide range by modifying the components of the composite as will be discussed below. The cross section may also be varied, many different tubular configurations are suitable.

Figure 5:
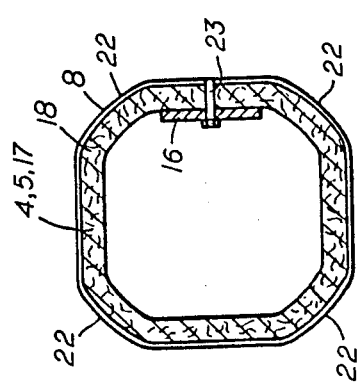
FIG. 5 is a cross-sectional view of an alternative embodiment of the composite post of this invention.

As depicted in FIGS. 2 and 5, this invention utilizes a closed form tubular configuration with a nominal wall thickness of 0.125" or one eighth of an inch. FIG. 2 illustrates a circular cross-section, and FIG. 5 illustrates an alternative nominally square cross-section. The primary reason for the choice of wall thickness was to control the resulting weight of the complete post. One eighth of an inch provides a good compromise between light weight and workability. The method of curing the resin in many cases is more economically achieved with a relatively thin walled section such as 0.125", but there are limits to how a thin section wall can be made which are not based on strength reasons. For example, wall thickness of as little as 0.1" have been manufactured, but the thickness of the resin band would probably not provide the needed weatherability.

The closed form surface illustrated in FIGS. 2 and 5 gives the required torsional rigidity and further allows a support surface for the sign 2 and mounting hardware 3. The closed form tube is in fact superior in bending stiffness to the metal channel posts, and as indicated above is many times greater in torsional stiffness. The square cross-section of FIG. 5 is illustrated with radiused corners 22 as would commonly result from the molds or dies used in most of the many types of manufacturing processes that can be utilized to produce the improved sign post 1. The type of curing, whether ultraviolet, heat, chemical catalyst, or other is likely to be controlled by economics only and is not greatly significant to the structural integrity of the improved safety post, or to the control of the failure mode of the safety post.

The greatest economic advantages would be further realized from a continuous molding process such as pultrusion, or filament winding or some variation of those processes. For special applications where cost is not an obstacle and where higher strength or even greater durability is required, i.e. "rough service" conditions, the more expensive higher strength resins and fibers could be utilized. Of particular note in these situations are such high strength fibers such as "KEVLAR", carbon, or "ARIMID" and analogous high strength resins that are known in the art. Hybrids of glass and/or other fibers may be used. Also of note is the availability of spun type rovings, which are beginning to appear in this country and which may become more economical in the near future. For most of the common applications, however, lower yield reinforcements, and consequently lower cost components will suffice. Examples of possible resins, which include both thermoset and thermoplastic resins, include but are not limited to: polyester, vinylester, epoxy, phenolic, nylon polypropelene, PVC, and urethane. These components are also well documented in the literature, and can be selected for the desired characteristics. Successful tests have been carried out utilizing roving and resin from Owens Corning Fiberglass (O.C.F.). The O.C.F. roving tested was 250 yield T-30 and the resin used in conjunction with that roving was O.C.F. polyester resin E-440 Type Orthophthalic, but any equivalent combination may be used. Also, as previously discussed, non-equivalent fibers and resins may be used where the configuration of the post is changed to compensate. Depending upon the other variables, source of components, desired strength, application, and others already discussed, the range for the percentage of glass by weight should be from 55% to 75%. The glass percentage by weight in the tested embodiment was 68% to 72%.

Figure 6:
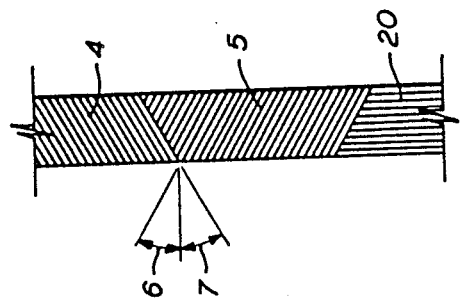
FIG. 6 is a cross-sectional view through the wall of the sign post of this invention.

In addition to the selection of the specific fiber 17 and resin 18 components, the fiber arrangement or placement within the resin is important in controlling the mode and location of failure upon impact while concurrently providing the needed strength characteristics. This is because the location and placement of the fibers in combination with the selection of the specific fibers and resin combinations provides the different modulus of elasticity characteristics in bending relative to shear previously discussed. Both longitudinal 20 and transverse 4,5 fibers, or transverse fibers alone may by used. FIGS. 2, 5, and 6. Filament winding is one method that allows placement of the fibers 17 to optimize the required directional strength, but normal winding machines traverse back and forth to lay down the reinforcements, and an interrupted process results. Suitable strength results can be obtained through pultrusion and the associated use of an over wrap of fibers 4, 5, (FIG. 6), with the further economic advantages of a more continuous process. FIG. 6 is a cross-section of a segment of the wall of a composite post 1 manufactured in accordance with one of the two mentioned processes which illustrates the placement of the first 4 and second 5 windings. At least two wraps are required to give one layer each angled oppositely to the longitudinal axis of the post. The total number of wraps 4, 5 or windings is again dependent upon the specific application of the post and the consequent required strength, and also upon the specific components selected. The range of appropriate wrap angles for manufacturing posts for highway signs is approximately from 10° to 80°. The ultimate selection depends upon both the application of the post and the components selected for constructing the post as previously discussed. One specific embodiment constructed of the O.C.F. resin and rovings utilized a wrap angle 6 of 15° (FIG. 6). The included angle 7 between subsequent wraps was therefore 30°. (FIG. 6). The tested embodiment was constructed with from 4 to 6 wrap layers but the number of wrap layers depends upon fiber selection and placement and post application.

In the foreseeable future new fibers under development that would provide the needed strength without the need for placing fibers transverse to the longitudinal axis of the sign post. One of the new fibers that shows promise has little filaments or bristles radiating out from the fiber. The filaments will interlock VELCRO-like with the filaments of neighboring fibers and with the resin matrix. This interlocking could provide the needed strength and the transverse windings could be dispensed with, while still providing the strength and improved performance of the sign post of this invention.

In the applications that utilize low cost resins, it will probably be necessary to provide a weather protective coating 8, (FIGS. 1, 2, 3, 4, 5, 7, 8, and 9) to match the durability of the steel posts. These coatings 8 could be either applied as a final step to the finished post, incorporated into the pultrusion line, or in the alternative an additive could be added to the resin to provide the needed weather protection. One coating choice would be a PVC plastisol of approximately 0.025". Another possibility would be an acrylic coating, of which Hetrolac 105 is a typical example. Commercial products of this sort are widely available. Common examples of the coating are produced by B. F. Goodrich and Ashland Chemical Resin, and additives for increasing weatherability are known by practitioners in the field of resin/fiber components.

Figure 14:
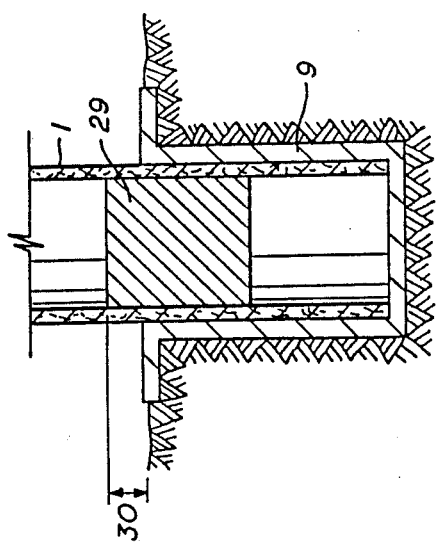
FIG. 14 is a cross-sectional view of an alternative embodiment of FIG. 13.

As mentioned, one of the considerations in selecting the design loads for the improved sign post was that of the loading generated during installation. Most of the prior art steel sign posts are simply driven into the ground. Others are installed in drilled holes and either back filled with the removed material, or provided with a small poured concrete footing. The improved sign post 1 of this invention can be installed with either of these methods. In addition, the post 1 of this invention can be installed by utilizing a ground anchor socket 9, as illustrated in FIGS. 8, through 14.

The usefulness of the improved post 1, 6 of this invention is destroyed by a significant impact from a moving vehicle, as is that of a prior art steel post. The optional ground anchor 9 was developed in an attempt to realize further economies by reducing the replacement cost of damaged sign posts. The improved sign post of this invention lends itself to use with a reusable anchor socket 9 more than a conventional post because of the controlled failure mode, which results in minimal damage to the anchor socket.

The optional ground socket 9 may be constructed of steel, steel protected by a thermoplastic coating, or entirely of thermoplastic. The socket 9 sleeve as illustrated in FIG. 10 is manufactured of welded 10 ga. steel. It may be coated with a plastisol coating 10. The socket of FIG. 10 is obviously manufactured to anchor a square tubular sign post such as that depicted by the cross-section of FIG. 5, but a similar design would work for the round tubular sign posts depicted in FIGS. 1 and 7. As illustrated the anchor socket 9 is provided with flanges 11 that assist in the installation, provide stability to the ground-anchor socket interface, and help control the bending failure mode of the sign post 1. The socket 9 illustrates a design to be embedded in the ground to a depth ranging between 12 to 24 inches, so that the flanges 11 will be flush with the surface. Installation of the anchor socket 9 can be by drilling or driving, the same as for a prior art steel post. The socket 9 may be manufactured by stamping symmetric halves from sheet metal, and then spot-welding 12 the two halves together or could be molded by a process similar to that used for constructing the post 1 itself. The inside dimensions of the sleeve so provided can be such as to provide a friction fit with the sign post 1. The sleeve may also be bonded to the sign post by common commercial grouts 24.

The socket 9 illustrated is provided with means for a positive mechanical locking connection to a post that has been installed within it. The means provided is through wedged shaped protrusions 13 on the interior of the socket. See FIGS. 8 and 9. As an alternative the socket may have triangular or other shaped ears 38 which may be bent to engage the surface of the post. FIG. 11. In this method the force of friction is utilized to secure the post from unauthorized removal. Both post to socket connections provide a mechanism for the controlled deceleration of the vehicle when the post is impacted as the post is pulled from the socket during the impact. The amount of force required to remove the post from the socket can easily be adjusted by providing a different number or configuration of the ears 38.. One of the many obvious variations provides eight ears, two upon each interior face of the socket. In this variation the ears 38 are stamped to form a 1 ½" tall 60° triangular point pointing in a downward direction. FIG. 11, the controlled failure of the resin/fiber interface of the post is assisted by the interaction of the socket or ground conditions. Installation of a post in an anchor socket is accomplished by pushing the post to the bottom of the socket. The protrusions 13 or 38 provided on the socket maY be formed as part of the stamping process. Depicted in FIG. 12 is an alternative system for installing the post 1 into the ground socket 9. This system utilizes a steel collar 39 grouted or bonded to the post 1. The collar 39 is provided with bump outs 40 that correspond to bump outs 41 provided on the ground socket. The collar i s also provided with flanges 42 that rest against the flanges 11 of the ground socket. The collar can be stamped from sheet metal in a manner similar to that used forming the socket. The same stamping can be used to provide the bump outs on both the collar and the socket. Removal of the stub from a ground socket is accomplished by simply breaking up the pieces and pulling them from the socket.

An alternative embodiment of the improved sign post is illustrated in FIG. 7. As depicted the alternative post uses a combination of cross sections with section change 21 between round Section 2—2 and square Section 5—5. Although the post illustrated in FIG. 7 depicts a round lower section in combination with a square upper section, the post could be inverted with the square section anchored in the ground and the round section upper most, if desired. The function of the section change in cross-section is to provide a likely shear plane to control more precisely the failure of the post upon impact from a moving vehicle.

A secondary attribute of using the round section in the lower portion of the post in conjunction with the essentially square upper portion is that the post may be more easily oriented with respect to traffic floW, and impact of the vehicle will not preferentially interface with any surface configuration if the round section is carries to the bumper height. The flat section allows a fastening surface for the mounted sign which should induce less fatigue stress in the sign and composite post body.

Figure 13:
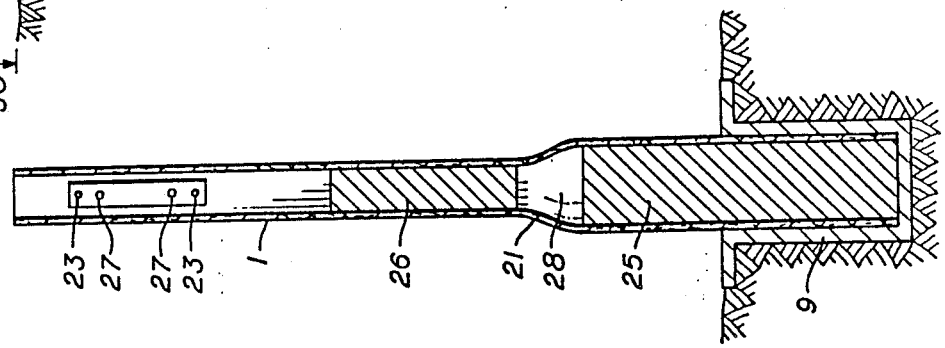
FIG. 13 is a cross sectional view of the post of FIG. 7.

FIG. 7 illustrates an alternative sign mounting 16 also depicted in the cross-sectional views of FIGS. 5 and 13. The alternative mounting 16 is a steel plate or plates affixed at the desired location on the interior surface of the hollow tube. The plate can be fixed by a variety of methods, for example by epoxy, by riveting 23 or by embedding the plate during the forming process. The plate can be provided with holes 27 or could be drilled in the field for nonstandard installations. FIG. 13. 8 to 10 gauge steel plates were satisfactorily tested. A further embodiment would either be drilled and tapped for sign bolts, or drilled for use with self tapping screws, or could have hex nuts tack welded in the proper location to match predrilled signs or self drilling and tapping attachments may be used.

In addition to the embodiments previously described, it may be desirable for some applications to provide a foam core 25 inside the hollow tubing of the safety post 1. FIG. 13 through 16. The foam core 25 adds weight and for that reason may be undesirable, but it could be used to provide additional structural stiffness and failure control. The foam core could also provide a method for encapsulating the alternative sign mounting system of an internal steel plate 16 previously described.

For most highway sign applications, a full length foam core would not be required for suitable structural performance. It could be used, however, in addition to the methods outlined above, to more precisely effect post failure when subjected to impact. One method of using a foam core for this purpose would to place plugs 26 of foam core to increase the strength of the post but to leave a void 28 on the interior of the post in the plane of desired failure. FIG. 13. An additional method is depicted in FIG. 14. FIG. 14 illustrates an internal plug 29 which has been located inside the sign post to assist in controlling the failure of the post. The rise 30 of the plug 29 above the ground surface may vary depending upon the desired plane of failure, and the depth of the plug below the ground surface will in turn vary according to the rise 30 chosen. The embodiment illustrated provides a rise 30 of 1 ½" and a depth of 6". FIG. 14.

Many types of phenolic foams are available and would work as desired in the post. Other examples that may be utilized are polyester foam cores using LUPER FOAM's foaming catalyst. A 3-5 P.C.F. phenolic closed cell foam manufactured by Koopers is a further example.

In use, the post 1 is either installed in the same manner as a conventional post by drilling or driving, or it may be utilized with the anchor socket 9. After the post is erected, the sign 2 or signs are installed with U-bolts 3 and hex nuts 15. If the post is provided with the optional internal steel plate 16, the previously described alternative sign mounting systems could also be used.

Once the sign post 1 is erected and the sign 2 attached, the system is complete, and it will withstand the normal wind and weather assaults. The expected life of the coated post 1 will approximate that of the prior art steel posts it replaces. Barring accidental collisions, that life should be on the order of 15 years, where the coating 8 is used.

In the event of a collision or impact from a moving vehicle. The sign post 1 will fail in a manner designed to minimize damage to the vehicle, and to minimize the potential for injury to the vehicle occupants. Upon impact, the usual failure mode is for the resin 18 to lose its stiffness integrity. Usually some fibers 4, 5 will remain intact, but in some cases the post 1 may be completely sheared through. Either case achieves the desired object of controlling the failure mode, and the post 1 will simply lay flat because of the loss of stiffness integrity, posing minimal threat to vehicle and occupants. A point near the point of impact is the usual location for this failure, but it may also occur at ground level. In either case the sign post 1 has no further stiffness and thereby poses far less of a threat to penetration of the windshield, even where the sign post lays over the hood on impact. The much lower total weight of the composite post is also of importance. The lower weight and inertia of the composite post make it more likely for the post to be kicked back out of the way than for it to penetrate the windshield. In the cases of high speed impact where the post is sheared completely through, the post may be tossed and up over the vehicle completely, further improving safety to the vehicle and occupants. Unlike a steel post, such a projected composite post poses little threat to other vehicles.

After an impact such as described above, the sign post must be replaced. The posts installed in the conventional manner must be dug up, and replaced. However the posts installed using the ground anchor socket 9 may be more quickly and economically replaced by removing the portion of the post remaining in the undamaged socket. A new post is then pushed into place, and the sign installed. Sign post locations subject to a higher incidence of vehicle collision are prime candidates for the reusable ground anchor system.

It is to be understood that the form of the invention herein shown and described is to be taken as a preferred example, and that numerous variations will be obvious to those skilled in the art in the light of the teachings of this specification, without departing from the scope of the hereinafter claimed subject matter.

What is claimed:

1. A thin walled tubular highway sign support post comprising at least one segment, wherein each segment is of substantially even cross-section along its entire length constructed from glass fiber stands and resin composite providing impact load failure control means for controlling the mode and location of post failure, wherein said failure control means comprises orientation of glass fibers transverse to the longitudinal axis of said post and a glass percentage by weight within the range of 55% to 75%, further comprising ground anchor means wherein said ground anchor means comprises a socket fixed in the ground that slidingly receives said post and locking means for installing said post and to selectively prevent the removal of said post.

2. The invention of claim 1 wherein the tubular post is circular in cross-section.

3. The invention of claim 1 wherein the tubular post is substantially rectangular in cross-section.

4. The invention of claim 1 constructed by a longitudinal fiber pultrusion process further comprising layers of overwrap fibers, said fibers wrapped transverse to the longitudinal axis of the post.

5. The invention of claim 1 wherein the longitudinal fibers are provided with means of interlocking connection one to another.

6. The invention of claim 1 where the transverse fibers are wrapped at an angle to the longitudinal axis within the range of 10° to 80° so that the included angle between alternate wrap layers is within the range of 20° to 160° and where the number of wrap layers comprises at least two layers, each successive layer wrapped at an approximately numerically equal angle but each successive layer oriented oppositely than the preceding layer, relative to the longitudinal axis of the post.

7. The invention of claim 1 further provided with means for weather protection.

8. The invention of claim 7 wherein the weather protection means is provided by selection of ultraviolet stable resins in the composite.

9. The invention of claim 7 wherein the weather protection means is provided by an additive to the resin prior to curing the composite.

10. The invention of claim 7 wherein the weather protection means is provided by a coating applied after curing the composite.

11. The invention of claim 1 wherein the locking means comprises stamped triangular ear protrusions into the interior of the socket that provide a frictional force that prevents unauthorized removal of the post and that further provides a controlled deceleration of impacting vehicle when the post is impacted as the post is pulled from the socket.

12. The invention of claim 1 wherein:
(a) the tubular post is circular in cross-section;

(b) the torsion and bending stiffness are provided by a thin walled section of approximately one eighth inch in thickness with transverse fibers;

(c) the composite post is constructed by a transverse filament winding process;

(d) the transverse fibers are wrapped at an angle to the longitudinal axis of the post within the range of 10° to 80° so that the included angle between alternate wrap layers is within the range of 20° to 160°;

(e) the number of wrap layers is at least 2;

(f) the modulus of elasticity and shear strength are provided by utilizing fiber percentage by weight within the range of 55% to 75% so that the approximate location of post failure will be in the plane near the point of impact and the mode of failure will be a destruction of the stiffness, integrity of the cured resin near the point of impact with a consequent loss of post stiffness at that location; and (g) the post is provided with weather protection.

13. The invention of claim 1 wherein said fibers and resin form a thin walled tube of approximately one eighth inch wall thickness.

14. The invention of claim 1 comprising multiple tubular segments connected in continuous end to end longitudinal and coaxial relationship and wherein adjacent segments are of different cross-sectional configurations.

15. The invention of claim 14 comprising two segments wherein the upper segment is rectangular in cross-section and the lower segment is circular in cross-section.

16. The invention of claim 14 further comprising weather protection means, connection means for connection of said post to ground anchor means, and ground anchor means that facilitates replacement of a post that has failed due to an impact load.

* * * * *